US012583167B2

(12) United States Patent
   Konermann et al.

(10) Patent No.:    US 12,583,167 B2
(45) Date of Patent:       Mar. 24, 2026

(54) COOLING RING FOR COOLING A FILM TUBE

(71) Applicant: Plast-Control GmbH, Remscheid (DE)

(72) Inventors: Stefan Konermann, Remscheid (DE);
            Martin Winhausen, Düsseldorf (DE);
            Mallzim Shabani, Leverkusen (DE)

(73) Assignee: Plast-Control GmbH, Remscheid (DE)

( * ) Notice: Subject to any disclaimer, the term of this patent is extended or adjusted under 35 U.S.C. 154(b) by 306 days.

(21) Appl. No.: 18/374,835

(22) Filed: Sep. 29, 2023

(65) Prior Publication Data

US 2024/0109236 A1      Apr. 4, 2024

(30) Foreign Application Priority Data

Oct. 4, 2022    (EP) ..................................... 22199516

(51) Int. Cl.
   *B29C 48/885*          (2019.01)
   *B29C 48/88*           (2019.01)
   *B29C 55/28*           (2006.01)
   *B29C 48/00*           (2019.01)
(52) U.S. Cl.
   CPC .......... *B29C 48/885* (2019.02); *B29C 48/912* (2019.02); *B29C 55/28* (2013.01); *B29C 48/0018* (2019.02)
(58) Field of Classification Search
   CPC . B29C 48/885; B29C 48/912; B29C 48/0018; B29C 55/28
   See application file for complete search history.

(56) References Cited

U.S. PATENT DOCUMENTS

| 5,281,375 A | 1/1994 | Konermann |
| 5,676,893 A | 10/1997 | Cree |
| 5,804,221 A | 9/1998 | Planeta et al. |
| 2017/0015043 A1 | 1/2017 | Shimizu et al. |

FOREIGN PATENT DOCUMENTS

| DE | 4001287 A1 | 7/1991 |
| EP | 0595037 A1 | 5/1994 |
| EP | 3132913 A1 | 2/2017 |

*Primary Examiner* — Christina A Johnson
*Assistant Examiner* — Xue H Liu
(74) *Attorney, Agent, or Firm* — Richard M. Goldberg

(57)          ABSTRACT

A cooling ring for cooling a film tube (14) in a film blowing installation, includes a cooling gas inlet (18), a distribution system (20) for distributing the cooling gas over the circumference of the film tube (14), a supply gap (28) for guiding the cooling gas in a radial direction towards the film tube, a cooling gas outlet forming an annular gap (34) that surrounds the film tube and is tilted at a tilt angle relative to the radial direction, a flexible adjusting ring (36; 36') arranged circumferentially in the annular gap, and a collar of individually controllable adjusting elements (44; 44') for local radial deformation of the adjusting ring, the adjusting ring arranged in engagement with a wall (32; 38') of the annular gap and forming a limiting wall (42) for the cooling gas flow exiting from the annular gap, the wall extending continuously in circumferential direction.

6 Claims, 3 Drawing Sheets

COOLING RING FOR COOLING A FILM TUBE

BACKGROUND OF THE INVENTION

The invention relates to a cooling ring for cooling a film tube in a film blowing installation, the cooling ring comprising a cooling gas inlet, a distribution system for distributing the cooling gas over the circumference of the film tube, a supply gap configured for guiding the cooling gas in a radial direction towards the film tube, a cooling gas outlet forming an annular gap that surrounds the film tube and is tilted under a tilt angle relative to the radial direction, a flexible adjusting ring arranged circumferentially in the annular gap, and a collar of individually controllable adjusting elements for local radial deformation of the adjusting ring.

In the production of blown films, a cooling ring of the type mentioned above serves for cooling the film tube, that has been freshly extruded from an annular die, by blowing a cooling gas, usually air, from inwards and/or from outwards against the film tube. By blowing-in internal air, the film tube is inflated to form a film bubble, with the result that the thermoplastic film material is stretched. The stretching process comes to an end at a so-called frost line where the temperature of the film material has decreased so far that the material loses its plasticity and stretchability. The faster the film is cooled, the lower is the amount of stretching, and the larger is the film thickness. The adjusting ring and the adjusting elements serve for controlling the cooling action such that a uniform film thickness is achieved on the entire periphery of the film tube.

DE 40 01 287 A1 discloses a cooling ring of the type indicated above, wherein the flexible adjusting ring is arranged in an annular gap that opens vertically upwards such that the adjusting ring separates the flow of cooling air into two partial flows one of which streams along the film bubble whereas the other one is directed away from the film bubble and does therefore not contribute to the cooling. By means of the adjusting elements, the radial position of each circumferential segment of the adjusting ring is adjusted in order to control the cooling effect. The film thickness along the periphery is measured above the frost line and is controlled in a feedback loop by controlling the adjusting elements.

U.S. Pat. No. 5,676,893 A discloses a cooling ring in which the adjusting ring is formed by a collar of vertically movable slides that project into the horizontally extending supply gap. The individually movable slides are arranged in engagement with one another so that they form an annular dam the height of which can be adjusted locally and which restricts the flow passage for the cooling air to a smaller or larger extent. On its way to the radially inner edge of the cooling ring, the flow of cooling gas is smoothened so far that the cooling gas flow varies only smoothly in circumferential direction.

EP 3 132 913 A1 discloses a similar cooling ring in which the restriction of the supply gap is achieved by adjusting a flexible adjusting ring.

SUMMARY OF THE INVENTION

It is an object of the invention to provide a cooling ring which has a compact design and enables a precise control of the thickness profile.

According to the invention, in order to achieve this object, the adjusting ring is arranged in engagement with a wall of the annular gap and forms a limiting wall for the cooling gas flow exiting the annular gap, which limiting wall extends continuously in circumferential direction.

By controlling the adjusting elements, the adjusting ring can be deformed in radial direction, thereby to locally reduce the effective width of the annular gap, with the result that the cooling effect is reduced in the pertinent circumferential segment and the cooling air eludes into neighbouring segments where the annular gap has a larger flow cross-section. In this way, the entire flow of cooling gas that is supplied from a blower or a pump can be utilized without loss for cooling the film, so that the energy consumption is low. The flexibility of the adjusting ring assures that the surface of the adjusting ring that delimits the effective flow passage for the cooling air has a continuous shape in circumferential direction and does not cause eddies in the cooling gas flow. The adjusting ring is held on the wall of the cooling ring such that it stays in contact with this wall regardless of the respective positions of the adjusting elements, so that practically no leakage occurs. Since the restriction of the cross-section occurs immediately at the cooling gas outlet, the thickness profile of the film bubble can be controlled with high angular resolution. Since the adjusting movements occur in radial direction, the cooling ring may further have a small dimension in height.

Useful embodiments of the invention are indicated in the dependent claims.

In one embodiment, the adjusting ring is guided in an interspace between two parallel holder rings and is adapted to be deformed by the adjusting elements such that it projects more or less out of the interspace, depending on the position of the adjusting elements. In this case, the holder rings assure a tight engagement of the adjusting ring at the wall of the cooling ring regardless of the local radial position of the adjusting ring.

In another embodiment, the adjusting ring has an attachment surface firmly held on the wall of the cooling ring, and the adjusting elements engage the adjusting ring in a position spaced apart from the attachment surface, so that they exert a bending moment onto the adjusting ring.

In yet another embodiment, the adjusting ring is inflatable segment-wise.

The invention is applicable to both, internal cooling rings and external cooling rings.

BRIEF DESCRIPTION OF THE DRAWINGS

Embodiment examples will now be described in conjunction with the drawings, wherein.

DETAILED DESCRIPTION

Figure 1:
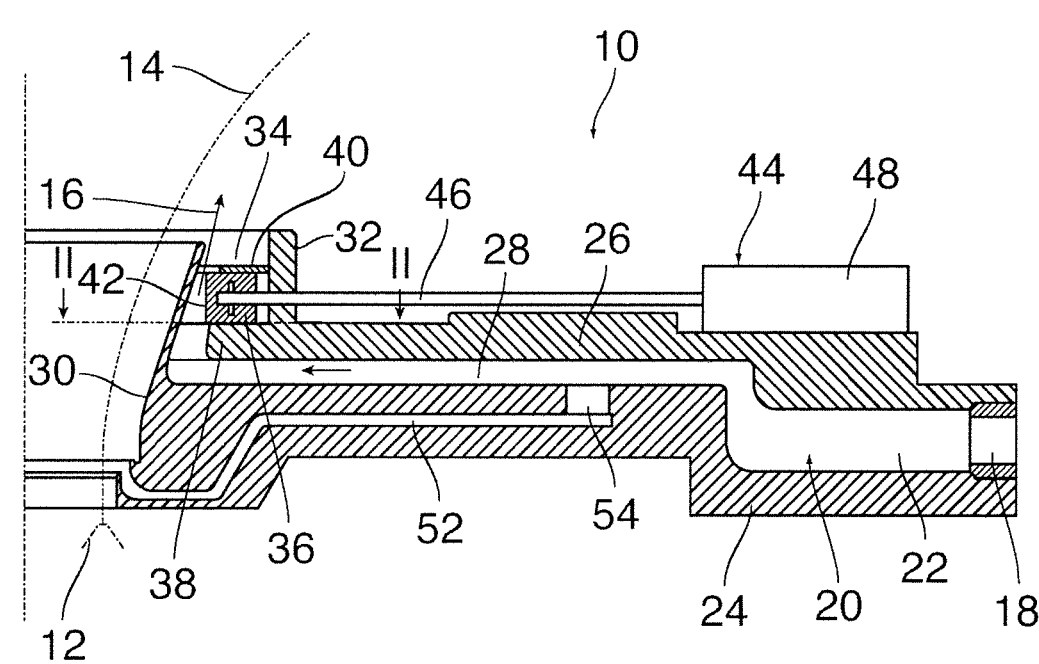
FIG. 1 is a radial section of a cooling ring according to the invention.

FIG. 1 shows a radial half-section of a cooling ring 10 that is arranged closely above an annular die 12 of a film blowing installation, the die 12 being shown in phantom lines. A film tube 14 is extruded from the annular die, is withdrawn upwards and is inflated radially by blowing air into the inside, so that the film material is stretched. In the example shown, the cooling ring 10 is an external cooling ring which serves to cool the film tube 14 during the stretching phase by directing a cooling gas flow 16 (symbolized by arrows) against the film tube such that it flows along the film.

At its outer periphery, the cooling ring 10 has at least one cooling gas inlet 18 via which the cooling gas that is supplied from a cooling gas source such as a blower is supplied into a distribution system 20 in the interior of the cooling ring. In the outer peripheral region of the cooling ring, the distribution system 20 forms a circumferentially extending ring space 22 which is delimited by a bottom member 24 and a top member 26 and in which the cooling gas can evenly spread over the entire circumference of the film tube 14. Radially inwardly, the ring space 22 is connected to a horizontal supply gap 28 via which the cooling gas is guided radially inwards towards the film tube 14 with simultaneous smoothening of the flow. At its inner peripheral edge, the bottom member 24 of the cooling ring forms a deflection bell 30 which closely matches the contour of the film tube 14 and deflects the cooling gas flow 16 into a direction approximately parallel to the film. The top member 26 of the cooling ring forms an axially raising wall 32 which, together with the deflection bell 30, delimits an annular gap 34 that is tilted obliquely relative to the radial direction and from which the cooling gas flow exits. An adjusting ring 36 made of rubber-elastic material, such as silicon, is circumferentially arranged in the annular gap 34. Here, the top member 26 forms a lower holder ring 38 and an upper holder ring 40. The adjusting ring 36 is guided to be radially displaceable between these holder rings on its entire circumference. A radially inner edge of the adjusting ring 36 projects out of the interspace between the holder rings so that a wall 42 at the inner periphery of the adjusting ring, together with the deflection bell 30, deter-mines the cross-section of the outlet gap for the cooling gas flow 16. A collar of adjusting elements 44 which serve for adjusting the radial position of the adjusting ring 36 in the various circumferential segments of the adjusting ring essentially independently from one another are arranged on the top member of the cooling ring. Each adjusting element 44 has an adjusting rod 46 one end of which is anchored in the adjusting ring 36 and which penetrates the wall 32 towards a drive motor 48 with associated transmission by which the adjusting rod 46 is adjustable in its radial position.

Figure 2:
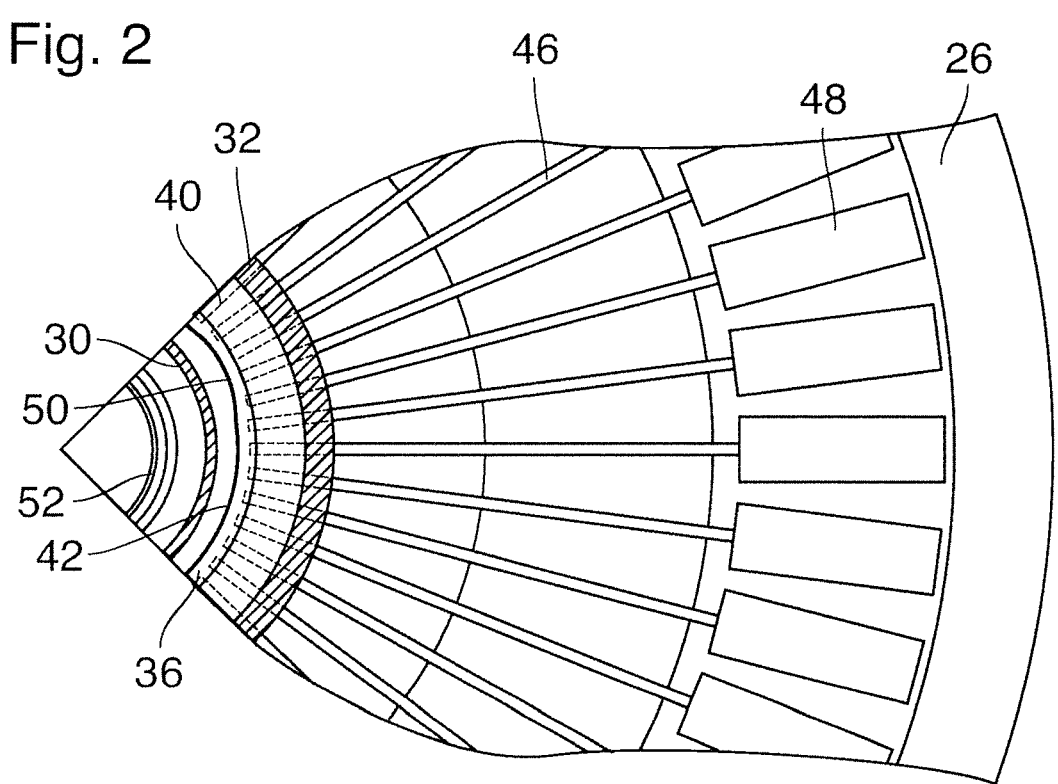
FIG. 2 shows a portion of the cooling ring in a partially sectioned top plan view.

In the top plan view in FIG. 2, the deflection bell 30 and the wall 32 are shown in a section along the line II-II in FIG. 1. What is seen here is the upper holder ring 40 and the edge of the adjusting ring 36 that projects radially inwardly beyond the edge of the holder ring 40. It can further be seen that the contour of the inner wall 42 of the adjusting ring is not exactly circular in this example. In the top part in FIG. 2, the adjusting rods 46 have been withdrawn to some extent so that, here, the wall 42 forms a bay 50 in which the width of the outlet gap for the cooling gas flow is enlarged. In this way, a more intense cooling and, consequently, a larger film thickness would be achieved in the corresponding circumferential region of the film tube 14.

However, the flexibility of the material of the adjusting ring 36 assures that the contour of the wall 42 is, on the entire circumference, a continuous (and differentiable) curve without any discontinuities that could create eddies in the cooling gas flow. An electronic controller (not shown here) for the adjusting elements 44 can be designed such that the difference in the radial position of each pair of adjacent adjusting rods 46 is limited, so that an excessive (shear) deformation of the adjusting ring 36 is avoided.

In FIG. 1, the adjusting ring has been shown to have a rectangular cross-section, but it may also be suitably rounded in the region of the wall 42.

In this embodiment, as is shown in FIG. 1, the bottom member 24 of the cooling ring forms a second exit gap 52 for the cooling gas. The exit gap 52 is connected, via a collar of openings 54 at its outer periphery, to the supply gap 28 so that a part of the cooling gas flow is diverted into the exit gap 52 which opens directly at the mouth of the annular die 12.

Figure 3:
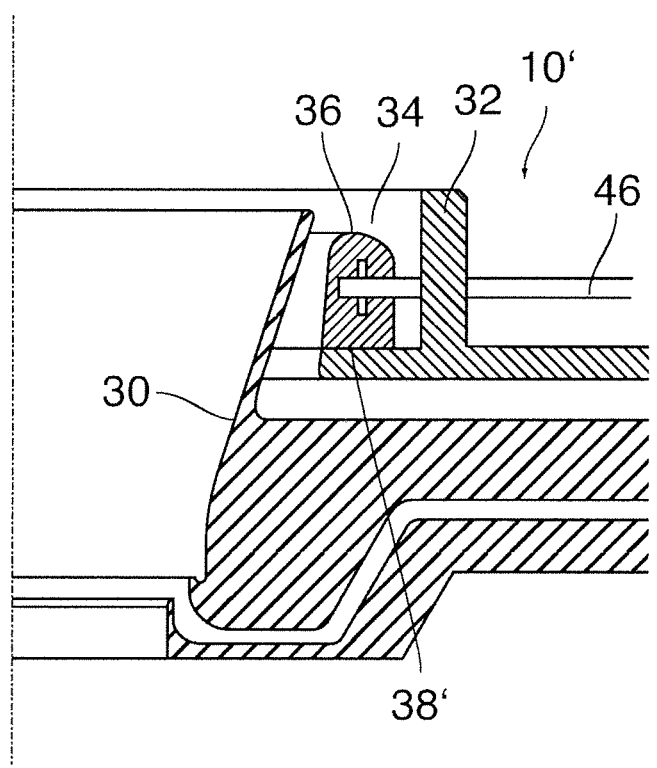
FIGS. 3 and 4 are enlarged sectional views of essential parts of a cooling ring according to another embodiment in two different conditions.
Figure 4:
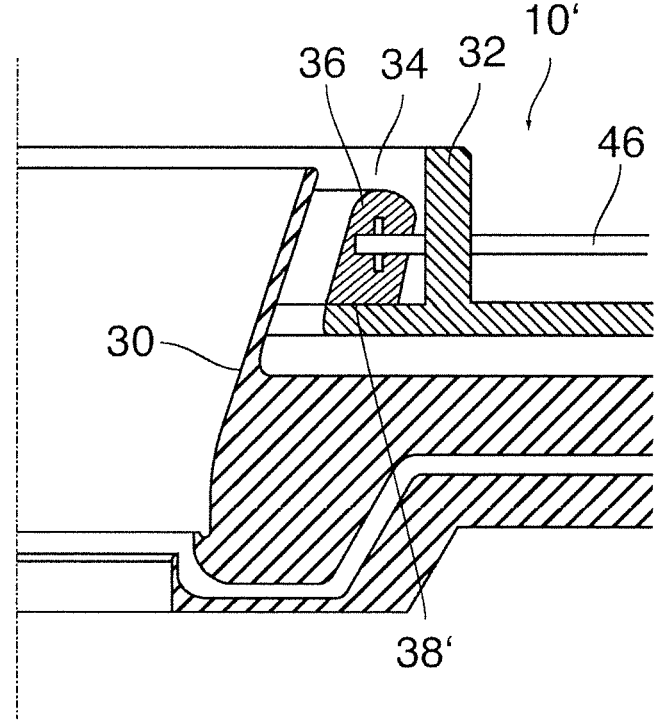

FIGS. 3 and 4 show parts of a cooling ring 10' according to a modified embodiment. This embodiment differs from the embodiment according to FIGS. 1 and 2 only in that the adjusting ring 36 is firmly attached to a wall 38' of the lower holder ring 38 so that the upper holder ring 40 may be dispensed with. Instead, the adjusting ring, which in this case has a certain streamline profile, projects freely into the annular gap 34. Since the points of attachment of the adjusting rods 46 are offset from the contact surface between the adjusting ring 36 and the wall 38, the adjusting rods exert a bending moment onto the adjusting ring 36, which makes it possible to deform the adjusting ring for example in the manner shown in FIG. 4.

In another embodiment which has not been shown here, the adjusting ring 36 may also be slidable on the wall 38'.

Figure 5:
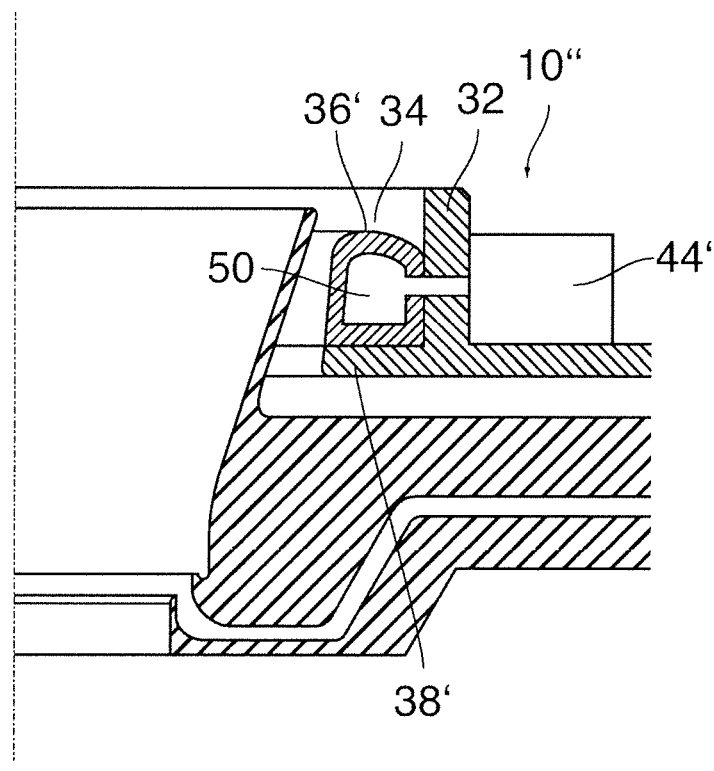
FIG. 5 is a sectional view of a cooling ring according to another embodiment.

FIG. 5 shows a cooling ring 10" having an adjusting ring 36' that is divided into a sequence of inflatable segments 50 in circumferential directions. Adjusting elements 44' are in this case configured as pneumatic elements by which the pressure in the segments 50 can be controlled individually.

What is claimed is:

1. A cooling ring for cooling a film tube in a film blowing installation, the cooling ring comprising:
   a cooling gas inlet,
   a distribution system for distributing cooling gas from the cooling gas inlet over a circumference of the film tube,
   a supply gap configured for guiding the cooling gas from the distribution system in a radial direction towards the film tube,
   a cooling gas outlet forming an annular gap that surrounds the film tube and is tilted at a tilt angle relative to the radial direction,
   a flexible adjusting ring arranged circumferentially in the annular gap, and
   a collar of individually controllable adjusting elements for local radial deformation of the adjusting ring, wherein the adjusting ring is arranged in engagement with a wall of the annular gap and forms a limiting wall which forms an undivided flow of the cooling gas exiting from the annular gap, said wall extending continuously in a circumferential direction.

2. The cooling ring according to claim 1, wherein the adjusting ring is slidably held at a holder ring and projects beyond this holder ring with an edge thereof forming the limiting wall.

3. The cooling ring according to claim 2, wherein the adjusting ring is slidable between two parallel holder rings and projects beyond at least one of said holder rings with its edge forming the limiting wall.

4. The cooling ring according to claim 1,
   wherein the adjusting ring is firmly attached to the wall of the annular gap and projects freely from this wall into the annular gap, and
   wherein the adjusting elements engage the adjusting ring at a position offset from said wall and are configured to exert a bending moment onto the adjusting ring.

5. The cooling ring according to claim 1, wherein the adjusting elements comprise radially extending adjusting rods that pass slidably through the wall of the annular gap and are attached to the adjusting ring.

6. The cooling ring according to claim 1, wherein the adjusting elements are configured for inflating inflatable segments of the adjusting ring.

\* \* \* \* \*